(No Model.)
J. B. LOTT.
VEHICLE WHEEL.
No. 436,565.        Patented Sept. 16, 1890.
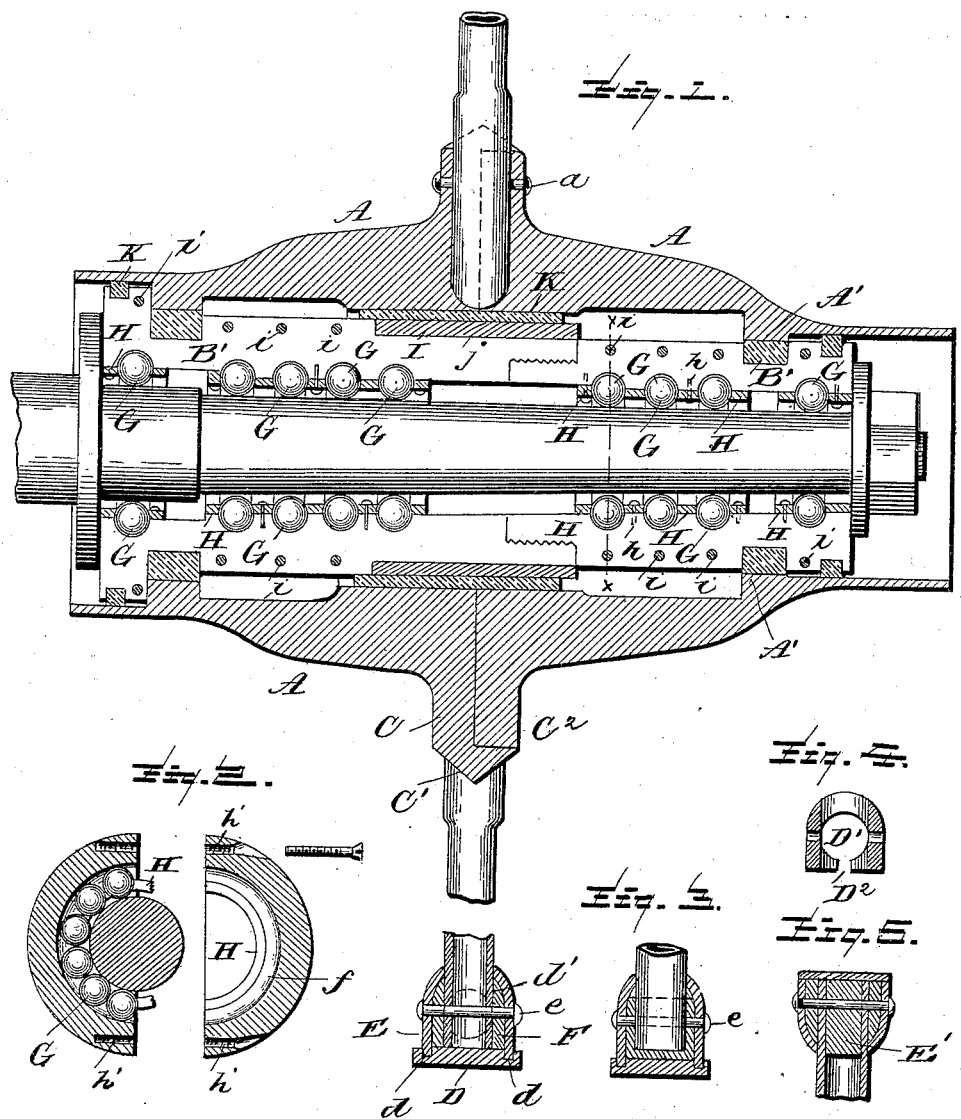
Witnesses
L. C. Hills
E. A. Boud
Inventor,
John B. Lott,
E. B. Stocking
Atty.

UNITED STATES PATENT OFFICE.

JOHN B. LOTT, OF KITTANNING, PENNSYLVANIA.

VEHICLE-WHEEL.

SPECIFICATION forming part of Letters Patent No. 436,565, dated September 16, 1890.

Application filed December 23, 1889. Serial No. 334,712. (No model.)

*To all whom it may concern:*

Be it known that I, JOHN B. LOTT, a citizen of the United States, residing at Kittanning, in the county of Armstrong, State of Pennsylvania, have invented certain new and useful Improvements in Vehicle-Wheels, of which the following is a specification, reference being had therein to the accompanying drawings.

This invention relates to vehicle hubs and sleeves, more particularly to a roller-bearing for the same; and it has for its object, among others, to provide an improved vehicle-wheel wherein a simple and efficient roller-bearing is so arranged and constructed that the rollers cannot drop out when the axle is removed.

It has for a further object to provide a two-part hub which shall be strong and efficient, and also to furnish a simple and cheap sleeve or box easily put together or separated for the purpose of removing or inserting the balls employed in the roller-bearing.

The novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a longitudinal section through a hub and skein, showing also a portion of one of the spokes in place. Fig. 2 is a cross-section on the line $xx$ of Fig. 1. Fig. 3 is a sectional detail showing one of the forms of attaching the tire to the spoke. Fig. 4 is a section through the plug. Fig. 5 is a sectional detail showing another manner of attaching the tire, felly, and spoke together.

Like letters of reference indicate like parts throughout the several views.

Referring to the details of the drawings by letter, A designates the hub, which is formed of two parts adapted to be united at their adjacent ends at the center of the hub, as indicated in Fig. 1. At one end—that is, the outer end—one of these halves or portions is formed with an inner annular shoulder or flange A', opposite which the annular elastic ring B is designed to work, as illustrated in Fig. 1. The outer end of the other half or portion is provided with a similar flange or shoulder B' for a like purpose. The adjacent ends of these two halves are constructed as follows: One half is formed with a portion C of a spoke-socket, with a rib C' between each socket portion, and the other half is formed or provided with the complement $C^2$, the outer end of which is adapted when the two halves are brought together to fit beneath the rib portion of the other socket portion, as shown clearly in Fig. 1, at the under side thereof. This makes a neat finish. When the spokes are inserted in their sockets, bolts $a$ are passed through the adjacent portions of the spoke-sockets and through the spokes, as illustrated in Fig. 1, and the parts drawn tightly together.

The outer ends of the spokes are secured to the felly and to the tire in various ways, and I deem it as within the scope of the present invention to secure these parts in any of the ways known to the trade, but have shown in the drawings some of the ways which I at the present time consider the most desirable. The spokes may be hollow or any other preferred form of construction, and may be set staggering or otherwise.

In Fig. 1, at the lower side thereof, I have shown one form or manner of securing the spoke, tire, and felly together. In this view the tire D is provided upon its inner face with two parallel grooves or recesses $d$ to receive the outer end of the felly E, which is substantially U-shaped in cross-section, as shown, and within this felly is placed a plug F, having a passage-way $d'$ for the outer end of the spoke, the said end passing through the opening in the plug and bearing directly upon the inner face of the tire, bolts or rivets $e$ being employed to secure the parts together, the said bolts or rivets passing through suitable holes provided in the plug. This plug is preferably bored longitudinally, as shown at D' in Fig. 4, for the purpose of lessening the weight thereof, and in some instances may be split, as shown at $D^2$, to permit of its being drawn together when the parts are drawn up by the rivets or bolts, thus acting as a tightening device. In Fig. 3 I have shown substantially the same arrangement and construction of parts, except that the end of the spoke, instead of bearing against the inner face of the tire, bears against the solid end of the plug, as clearly illustrated in said Fig. 3.

In Fig. 5 I have shown the plug between spoke and felly, and a plug E' within the outer end of the spoke, and the tire instead of being provided with the parallel grooves, is a simple flat tire bearing against the outer end of the inner and outer plugs and against the end of the spoke and felly. Transverse bolts or rivets serve to secure the parts together.

The box or sleeve is composed of two sections each formed in two parts. The parts composing one section are provided at their outer ends with an internally-threaded socket, as shown at F', to receive the externally-threaded projecting portion on the other portion, as shown in Fig. 1. The two sections are designed when joined together, as shown in Fig. 1, to form the complete box or sleeve with a central opening to receive the axle-skein in the usual manner. The inner face of each half of the two sections is formed with an annular groove $f$ to receive the balls or rollers G, the number of which may be varied under varying circumstances. In the drawings I have shown twelve in each circle around the spindle; but more or less may be employed, as deemed best. These balls or rollers are prevented from accidental displacement in case of removal of the axle by means of rings or retainers H, one being employed between each ring of balls, and these rings have their inner faces rounded to correspond to the curvature of the balls employed and are of such a thickness as to prevent the balls from dropping out, but yet not thick enough to prevent the acting portions of the balls from projecting beyond them so that the said acting faces of the balls shall contact with the spindle, as shown in Fig. 1. These rings or retainers may be held in place by any suitable means—such, for instance, as by nails, screws, or other fastenings $h$. The two portions of each section of sleeve are held together detachably by means of screws or other suitable means $i$, passed through suitable holes $h'$ therein, as shown in Figs. 1 and 2.

In assembling the parts of the sleeve the two sections composing the inner half are first placed together and secured and sleeved on the spindle, the balls having been first secured in each half, the retainers being made in semicircular shape for this purpose. A band I is then shrunk on the outer end of the two halves, as shown in Fig. 1, a depression $j$ being provided for the reception of the said band, so that when the band is in place it will be flush with the outer periphery of the sleeve. The portions constituting the outer half of the sleeve are then provided with their balls and then secured together by means of their screws or other securing means and sleeved on the spindle, the inner threaded end screwed into the screw-threaded socket in the outer end of the inner portion, as shown in Fig. 1, and the nut screwed on the outer end of the spindle. A roller-bearing thus constructed is simple and the balls cannot be displaced and lost when the spindle is removed.

I may provide an elastic ring or rings between the sleeve and hub where deemed necessary. In the drawings I have shown two— one at the inner and one at the outer end— and marked K.

What I claim as new is—

1. A hub formed of two portions, each constructed with a portion of the spoke-sockets, and one of said portions formed with ribs between each socket, with a shoulder beneath the rib, beneath which the socket portions on the other section fit and are hidden, substantially as specified.

2. In a vehicle hub or wheel, a sleeve formed in halves and each half in sections, and each section provided with rollers held therein against displacement when the spindle is removed, the two sections being held together by means at right angles to the shaft, as set forth.

3. A sleeve formed upon its inner face with a groove for the reception of rollers, rollers in said groove, and a retainer concentric with the groove for holding the rollers in place, substantially as specified.

4. A sleeve formed upon its inner face with a plurality of grooves, rollers in said grooves, and a curved retainer within the sleeve and concentric therewith to retain the rollers therein, with the acting-faces of the rollers projecting beyond the retainer, as set forth.

5. A sleeve formed in sections, the outer end of one section being provided with an internally-threaded socket and the inner end of the other section formed with an externally-threaded portion to engage the same, and a band encircling the sleeve around the said socket, substantially as specified.

6. A sleeve formed in sections provided with a screw-threaded engagement and the inner faces of each section provided with rollers seated in grooves therein, and retainers concentric with the sleeve between each row of rollers for holding the rollers in place, with the acting-faces of the rollers projecting beyond the retainers, substantially as specified.

7. The sleeve formed in sections provided upon their inner faces with annular grooves, rollers in said grooves, retainers between each row of rollers for holding the rollers in place, and securing means passed through holes in the two sections for holding the same together, substantially as specified.

8. In a vehicle-wheel, a plug perforated longitudinally by a bore D' for lightness, vertically for the reception of the spoke, and transversely for the cross-bolts, substantially as specified.

9. In a vehicle-wheel, a plug perforated longitudinally by bore D' for lightness, vertically for the reception of a spoke, transversely for the reception of securing means, and split at its outer end, whereby it serves, also, as a tightening device, substantially as specified.

In testimony whereof I affix my signature in presence of two witnesses.

JOHN B. LOTT.

Witnesses:
H. B. ZEVELY,
H. J. FINLEY.